US009584232B1

(12) United States Patent
Dolan et al.

(10) Patent No.: US 9,584,232 B1
(45) Date of Patent: Feb. 28, 2017

(54) CO-CHANNEL INTERFERENCE MODEL AND USE THEREOF TO EVALUATE PERFORMANCE OF A RECEIVER

(71) Applicant: Exelis Inc., McLean, VA (US)

(72) Inventors: John Dolan, Chantilly, VA (US);
Michael A. Garcia, Ashburn, VA (US);
James Stafford, Herndon, VA (US);
Antonio Scarciglia, Simi Valley, CA (US)

(73) Assignee: Exelis Inc., McLean, VA (US)

( * ) Notice: Subject to any disclaimer, the term of this patent is extended or adjusted under 35 U.S.C. 154(b) by 222 days.

(21) Appl. No.: 14/640,499

(22) Filed: Mar. 6, 2015

(51) Int. Cl.
| | |
|---|---|
| *H04B 1/00* | (2006.01) |
| *H04B 17/345* | (2015.01) |
| *H04W 24/06* | (2009.01) |
| *H04B 17/336* | (2015.01) |
| *H04L 12/24* | (2006.01) |
| *G06G 7/72* | (2006.01) |

(52) U.S. Cl.
CPC .............. *H04B 17/345* (2015.01); *G06G 7/72* (2013.01); *H04B 17/336* (2015.01); *H04L 41/142* (2013.01); *H04W 24/06* (2013.01)

(58) Field of Classification Search
CPC .................... H04L 12/2697; H04L 2012/4028; H04L 41/145; H04L 43/50
USPC ........ 455/63.1, 63.11, 67.13, 99, 297, 115.1, 455/427, 428, 430, 431, 501; 434/29, 30; 370/241; 701/2, 14; 342/37; 380/270
See application file for complete search history.

(56) References Cited

U.S. PATENT DOCUMENTS

| | | | | | |
|---|---|---|---|---|---|
| 4,057,913 | A | * | 11/1977 | Eisenberg ................ | G09B 9/08 434/14 |
| 4,134,217 | A | * | 1/1979 | Neilson .................... | G09B 9/26 342/396 |
| 4,192,082 | A | * | 3/1980 | Deaton .................... | G09B 9/54 342/13 |
| 4,203,113 | A | * | 5/1980 | Baghdady ............... | G01S 7/411 342/418 |
| 4,608,022 | A | * | 8/1986 | Bellofatto ................ | G09B 9/24 434/243 |
| 5,009,598 | A | * | 4/1991 | Bennington ............. | G09B 9/08 244/194 |
| 5,906,336 | A | * | 5/1999 | Eckstein ................ | B64D 39/00 244/135 A |
| 6,067,041 | A | * | 5/2000 | Kaiser ................... | G01S 7/4052 342/165 |

(Continued)

*Primary Examiner* — Tan H Trinh
(74) *Attorney, Agent, or Firm* — Edell, Shapiro & Finnan LLC

(57) ABSTRACT

A computer simulates flight routes for simulated airborne transmitters across a spatial region divided into unit area tiles and over time based on actual aircraft flight plan data. The computer determines transmitter counts per tile per time interval based on the flight routes and assigns transmit parameters, including transmit message rates, to the transmitters. The computer determines transmit message rates per tile based on the transmitter counts and the transmit parameters. The computer generates, for a simulated receiver, an antenna pattern covering at least some of the tiles, and converts the transmit message rates of the covered tiles to a total effective receive message rate of interfering messages at the receiver. The computer determines a probability of successful detection of a desired message among the interfering messages at the receiver based on the effective receive message rate.

22 Claims, 7 Drawing Sheets

(56) References Cited

U.S. PATENT DOCUMENTS

| | | | | |
|---|---|---|---|---|
| 6,201,786 B1* | 3/2001 | Zscheile, Jr. | ....... | H04W 52/288 370/206 |
| 6,438,492 B1* | 8/2002 | Le Tallec | .............. | G01S 5/0072 340/961 |
| 6,501,424 B1* | 12/2002 | Haendel | .................. | G01S 19/07 342/357.31 |
| 7,099,752 B1* | 8/2006 | Lenell | .................. | G05D 1/0027 244/189 |
| 2005/0220029 A1* | 10/2005 | Calluaud | ............ | H04L 12/2697 370/241 |
| 2006/0160049 A1* | 7/2006 | Zora | ........................ | G09B 9/28 434/29 |
| 2006/0216674 A1* | 9/2006 | Baranov | .................. | G09B 9/08 434/29 |
| 2008/0266166 A1* | 10/2008 | Schuchman | ........... | G07C 5/008 342/37 |
| 2008/0316052 A1* | 12/2008 | Ruffini | .................. | H04W 28/18 340/901 |
| 2011/0246002 A1* | 10/2011 | Shavit | .................. | G08G 5/0026 701/14 |
| 2011/0250569 A1* | 10/2011 | Connor | .................... | G09B 9/08 434/30 |
| 2012/0089275 A1* | 4/2012 | Yao-Chang | ............ | A63H 30/04 701/2 |
| 2012/0156653 A1* | 6/2012 | Wokurka | .................. | G09B 9/16 434/30 |
| 2014/0070981 A1* | 3/2014 | Kim | ..................... | G01S 7/4052 342/171 |
| 2015/0149137 A1* | 5/2015 | Echtermeyer | ............. | B64F 5/00 703/8 |
| 2015/0221121 A1* | 8/2015 | Morishita | ............ | G06T 11/206 345/419 |
| 2016/0155342 A1* | 6/2016 | Gibson | .................. | G01S 5/0054 701/409 |
| 2016/0239372 A1* | 8/2016 | Chakrabarti | .............. | G06F 9/38 |

* cited by examiner

CO-CHANNEL INTERFERENCE MODEL AND USE THEREOF TO EVALUATE PERFORMANCE OF A RECEIVER

BACKGROUND

A receiver attempts to decode a message of interest (i.e., a "desired message") received from a transmitter on a radio frequency channel. In a "clear sky" environment, the receive channel is free from undesired interference from other transmitters, in which case the receiver optimally detects the desired message. In contrast, co-channel interference from other interfering transmitters within range of the receiver degrades the ability of the receiver to optimally detect the desired message. A model or simulation of co-channel interference may be used to determine an expected receiver performance under different co-interference conditions; however, a model that realistically represents dynamic co-channel interference experienced at the receiver is difficult to construct. Model complexity increases if the receiver and interfering transmitters are assumed to move relative to each other, for example, if the receiver and the other transmitters are assumed to be airborne. Model complexity further increases if the model attempts to incorporate other time-varying, inter-dependent, transmit-related factors or parameters, such transmit power ranges and different types of transmit link technologies associated with the transmitters.

SUMMARY

In one embodiment, a computer simulates flight routes for simulated airborne transmitters across a spatial region divided into unit area tiles and over time based on actual aircraft flight plan data. The computer generates a clock signal and derives periodic time intervals from the clock signal. The computer determines transmitter counts per tile per time interval based on the flight routes and assigns transmit parameters, including transmit message rates, to the transmitters. The computer determines transmit message rates per tile based on the transmitter counts and the transmit parameters assigned to the transmitters in the transmitter counts. The computer generates, for a simulated receiver, an antenna pattern covering at least some of the tiles, and converts the transmit message rates of the covered tiles to a total effective receive message rate of interfering messages at the receiver. The computer determines a probability of successful detection of a desired message among the interfering messages at the receiver based in part on the effective receive message rate.

In another embodiment, a receiver includes an antenna, a radio frequency (RF) receiver coupled to the antenna, and a controller coupled to the RF receiver. The controller performs a computer simulation that models co-channel interference and determines a simulated probability of successful detection of a desired message among the modeled interfering messages at a simulated receiver based on the modeled co-channel interference. The controller determines an actual probability of successful detection of an actual desired message among actual interference messages delivered from the RF receiver, compares the actual probability to the simulated probability, and adjusts signal processing parameters in the RF receiver responsive to results of the compare.

DETAILED DESCRIPTION

1. Co-Channel Interference Environment

Figure 1:
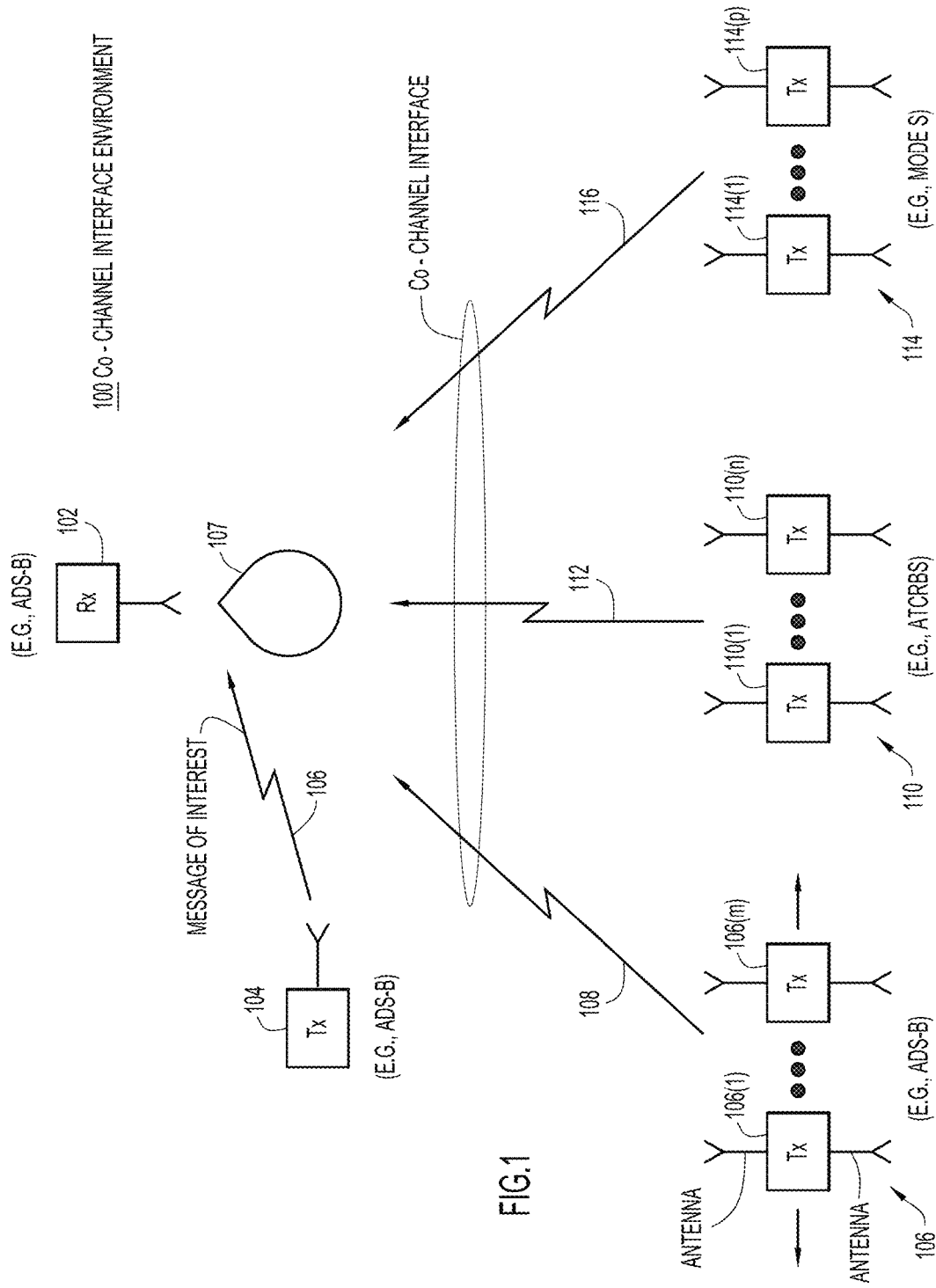
FIG. 1 is a block diagram of an example co-channel interference environment for a receiver that may be modeled or simulated according to embodiments presented herein.

With reference to FIG. 1, there is a block diagram of an example co-channel interference environment 100 for a receiver that may be modeled or simulated according to embodiments presented herein. Environment 100 includes a receiver (RX) 102 hosted on an airborne or a space-based platform (not shown in FIG. 1) and a "friendly" transmitter (TX) 104 that receive and transmit on a same frequency channel/band, respectively, and each operate according to a first link technology, e.g., Extended Squitter (ES) Automatic Dependent Surveillance Broadcast (ADS-B) link technology (referred to as "1090ES ADS-B"). A given "link technology" associated with an airborne or space-based platform may also be referred to as "avionics technology" or an "avionics link technology." Receiver 102 captures a desired message 106 (also referred to as a desired "reply message" 106) transmitted on the frequency channel by friendly transmitter 104 in an antenna receive beam 107 associated with the receiver, and attempts to decode the captured message. The process of reception and decoding is referred to as "detection."

Environment 100 also includes: interfering transmitters 106(1)-106(m) that operate and transmit first transmit messages 108 on the frequency channel in accordance with the first link technology, e.g., the 1090 ES ADS-B (referred to as simply "ADS-B") link technology; second transmitters 110(1)-110(n) that operate and transmit second messages 112 on the frequency channel in accordance with a second link technology, such as the Air Traffic Control Radar Beacon System (ATCRBS) link technology; and third transmitters 114(1)-114(p) that operate and transmit messages 116 on the frequency channel in accordance with a third link technology, such as Mode S link technology. In an embodiment, at least some of transmitters 106, 110, and 114 are airborne transmitters carried on aircraft that traverse flight paths at altitudes that are lower (or higher) than an altitude of receiver 102. As such, the airborne ones of transmitters 106, 110, and 114 may transmit respective transmit messages 108, 112, and 114 from upper antenna beams or lower antenna beams (not shown in FIG. 1) that point upward and thus substantially toward receiver 102 or downward and thus substantially away from receiver 102.

Transmit messages 108, 112, and 116 captured in receive beam 107 represent undesired "false replies" that are uncorrelated with each other in time when they arrive at receiver 102. The false replies represent co-channel interference that degrades an ability of receiver 102 to optimally detect desired message 106 relative to when the receiver operates under a clear sky condition. Embodiments herein are directed to a model or simulation of co-channel interference environment 100 that realistically represents dynamic co-channel interference experienced at receiver 102 over the spatial region in which the receiver and interfering transmitters 106, 110, and 114 operate. The model may be used to determine an expected receiver performance of receiver 102 under different co-channel interference conditions.

In an embodiment of the model in which receiver 102 and at least some of interfering transmitters 106, 110, and 114 are assumed to be airborne, the model incorporates the effects of relative motion between the receiver and the interfering transmitters on co-channel interference (i.e., the false replies) as the transmitters traverse modeled or simulated flight paths derived from actual aircraft flight path information. The model also incorporates time-varying, inter-dependent, transmit-related factors or parameters, such as the number of interfering transmitters (and thus false replies), their transmit power ranges, the different types of transmit link technologies associated with the transmitters, and the ability of the transmitters to transmit in different directions relative to the receiver. In other embodiments, receiver 102 may be assumed to be land-based.

2. Fruit Model

The aforementioned co-channel interference model is also referred to herein as a "False Replies Uncorrelated In Time" (FRUIT) model or environment, where the "False Replies" refer to interfering transmit messages, such as transmit messages 108, 112, and 116. In an embodiment described below, the FRUIT model simulates 1090 MHz in-band (i.e., co-channel) interference from a mix of different types of 1090 MHz radar avionics technologies already introduced above. In this embodiment, the following avionics technologies are considered contributors to the 1090 MHz FRUIT model/environment: ADS-B (e.g., transmit messages 108); ATCRBS (e.g., transmit messages 112); and Mode S (e.g., transmit messages 116). These avionics technologies have different link characteristics individually, but typically combine together into aggregate interference (e.g., transmit messages 108, 112, and 116) to degrade the reception of desired ADS-B aircraft messages (e.g., message 106). Alternative embodiments of the FRUIT model may employ link technologies other than those listed above, as would be appreciated by one of ordinary skill in the relevant arts having read this description.

ATCRBS is one of the oldest aircraft surveillance link communication schemes. The encoding and behavior of ATCRBS is based on the Identification Friend or Foe (IFF) system used during World War II. ATC radars will interrogate at 1030 MHz using ATCRBS calling signals and the ATCRBS avionics will reply on 1090 MHz with a pulse amplitude modulated (PAM) signal that has a duration of about 20 µs. Each ATCRBS message only tells the recipient either the four digit octal identifier (Mode A reply) or the altitude (Mode C reply) of the aircraft. Many ATCRBS surveillance systems end up requesting multiple replies from aircraft using doublet and triplet schemes in order to improve the reliability of the receptions and correlations of aircraft replies at the radars. In a densely populated area with multiple radars operating within a few hundred nautical miles, several radars and other aircraft-based surveillance systems (such as TCAS) will make their own independent requests for ATCRBS replies, resulting in escalating 1090 MHz transmission rates.

Mode S was introduced in the 1960s as an update to ATCRBS avionics. The link scheme was improved from ATCRBS including Cyclic Redundancy Checks (CRC), increased number of bits per message (56 instead of 12), and the use of pulse position modulation (PPM) instead of PAM. Additionally, every Mode S message contains a globally unique identifier (ID) of the aircraft known as the ICAO or 24-bit Target Address, vastly improving message-to-message correlation. This permitted radar and aircraft surveillance systems to lower their overall rates of interrogations and thus elicits of replies; however, all of these radar and aircraft systems were still independent of each other and thus still resulted in a large amount of redundant messaging per aircraft.

ADS-B was introduced and developed in the 1990s largely based on the Mode S messaging scheme. The key difference being that neither ground nor airborne systems could request transmissions from these avionics, but rather the avionics would automatically broadcast their replies based with pseudorandom time intervals between each message. These long messages (112 bits) also contain aircraft state vector information that conveys the aircraft's on-board GPS navigation information directly to any 1090 ADS-B receiver. The communication of state vector information practically eliminates the need for any interrogation since the plane has determined its own position via GPS and is conveying that to any ADS-B 1090 MHz receiver. An encoded position of the can be verified through time difference of arrival (TDOA) and/or low frequency interrogation surveillance. Therefore, 1090ES ADS-B has a relatively static per-aircraft channel occupancy rate that will eventually reduce the Mode S and ATCRBS reply rates exhibited today.

2.1 FRUIT Impact on Receiver Performance

The FRUIT model/environment can be used to evaluate the effect of false replies on the performance of receiver 102, given certain assumptions. If it is assumed that antenna beam 107 of receiver 102 has a known, relatively high gain, antenna pattern pointed at a given position on the earth at a given time, the FRUIT model gives a number of false replies captured by the antenna beam at the given position and time. If it is also assumed that the effect of the false replies from the FRUIT environment on receiver performance follows the behavior of a Poisson Arrival Rate system, i.e., interference arrives and the receiver according to a Poisson distribution and the receiver performance degrades as the number of false replies at the receiver increases according to the Poisson distribution, the FRUIT environment reveals the impact of (modeled) co-channel interference on the expected probability of successful reception and decoding (i.e., detection) of a desired message, $P_d$, of the receiver at the given position and time.

The assumption of a Poisson Arrival Rate system is that the messaging scheme used for transmitting and receiving messages corresponds to that of a random access channel. A random access channel is a relatively cheap and efficient means of communication since time-synchronization is not required of the transmitter or the receiver. In the special case of a channel with perfect reception of non-interfered messages, zero reception of overlapped messages, and all messages having the same arrival rate and duration time, as the offered load, G (rate of transmitted messages in a region per transmission duration time), increases, the detection probability of a message decreases exponentially, i.e. $P_d = e^{-2G}$.

In the example described above in which message 106 and messages 108, 112, and 116 correspond to ADS-B, ADS-B, ATCRBS, and Mode S messages, respectively, in order to account for the complexity specific to desired ADS-B message reception (e.g., reception of message 106 as it relates to ATCRBS, Mode S, and other ADS-B interfering transmissions, we start with $P_R$, the probability of successful reception and decoding (i.e., detection) of an ADS-B message in a clear sky environment, i.e. without co-channel interference from the FRUIT model/environment.

Then several assumptions about the probability of successful reception and decoding (i.e., detection) in the presence of given number n of interfering messages of the various types are made. For Mode S and ADS-B messages, it is assumed that only zero overlap is tolerable for the desired ADS-B message to be successfully received and decoded (i.e., detected) and that "room" in time must be created for it. The probability of reception and decoding given n interfering arrivals is therefore assumed to be:

$$P_{ModeS/ES}(R|n) = \begin{cases} P_R & n = 0 \\ 0 & n > 0 \end{cases};$$

and for ATCRBS it is assumed that the minimal probability of reception for a receiver with zero to three overlapping ATCRBS messages is given by:

$$P_{ATCRBS}(R|n) = \begin{cases} P_R & n = 0 \\ 0.89 P_R & n = 1 \\ 0.64 P_R & n = 2 \\ 0.52 P_R & n = 3 \\ 0 & n > 3 \end{cases}.$$

As mentioned above, it is assumed that the arrivals of each interfering message follow a Poisson arrival process. For such a process with parameter $\lambda$, the number of arrivals is:

$$P_\lambda(n) = \frac{\lambda^n}{n!} e^{-\lambda}.$$

Finally, it is assumed that the three classes of interfering signal arrive independently of each other. And so, this gives $P_d = P_R \cdot P_{ATCRBS} \cdot P_{ES} \cdot P_{ModeS}$.

Putting all of these assumptions together leads to equation (1) which is the basis of receiver performance under the FRUIT model, according to an embodiment:

$$P_d = P_R \left(1 + 0.89 \lambda_{ATCRBS} + \frac{0.64}{2} \lambda_{ACTRBS}^2 + \frac{0.52}{6} \lambda_{ACTRBS}^3 \right) \quad (1)$$
$$e^{-(\lambda_{ATCRBS} + \lambda_{ES} + \lambda_{ModeS})}$$

Equation 1 can be summarized as $P_d = P_R \cdot P_{env}$, where $P_{env}$ represents an interference environment scaling factor to the clear sky detection probability $P_R$.

The $\lambda$ terms are the throughput values (receive message rates) for each respective link technology.

For example, $\lambda_{ModeS}$ is the expected throughput effect of the Mode S messages (normalized to account for signal fading) on the desired ADS-B message of interest. $\lambda_{ModeS}$ is also referred to as the Mode S reply rate (messages/sec) at a give power level, and is given by the equation $\lambda_{ModeS} = \phi_{ModeS} \cdot \tau_{ModeS}$, where $\phi_{ModeS}$ is an effective reply rate (see below), and $\tau_{ModeS}$ is a duration of each Mode S message plus a duration of an ADS-B message (64 µs+120 µs).

The duration values are assumed to be as follows: $\tau_{ATCRBS}$=141 µs, $\tau_{ModeS}$=184 µs, and $\tau_{ES}$=240 µs.

Given the assumptions for values above, the only unknown to be determined in the equation $\lambda_{ModeS} = \phi_{ModeS} \cdot \tau_{ModeS}$ is the $\phi$ value (and similarly for the other link technologies). An assumption is made that the FRUIT model (effect of interfering messages) has an independent "field effect" on each of multiple receive beams in a multiple receive beam scenario. This means that each of the beams can be handled such that the combined effect of the FRUIT model impacts any and all other received desired messages (e.g., ADS-B messages) with the same "penalty." This assumption is rooted in the idea that $\phi$ may be calculated using a tile/grid based approach with the beam gain contours applying a respective weight to each grid point. In this way, an effective message arrival rate may be calculated as:

$$\varphi_{ModeS}(h) = \sum_{i=1}^{n} \varphi_{ModeS}(h, t_i) \cdot \gamma_{t_i},$$

where h is a simulation time (where the time may be expressed relative to an hour boundary), and $t_i$ the $i^{th}$ tile of the observable n tiles at the simulation time h. The gain or receiver-related weighting factor $\gamma_{t_i}$ is based on the receiver's (e.g., receiver 102's) Message Error Rate (MER) relationship to the energy per bit relative to noise floor density ($E_b/N_0$) calculated at the $i^{th}$ tile for a particular beam at time h and aircraft transmit power. A penalty can be applied as a function of elevation, $\alpha$, in order to determine the relative gain from a bottom antenna squitter versus a top antenna (e.g., for a TLAT style antenna, $\beta_{bottom} = \beta_{top} - 0.373\alpha$ in dB, where a is in degrees). Typically, the $E_b/N_0$ link budget will be calculated to a tile from the satellite as a function of range, azimuth and elevation to a 125 Watt (W) aircraft transmitter. An increase in transmitter power improves the $E_b/N_0$ by 3 dB (250 W) or 6 dB (500 W).

2.2 Generating the FRUIT Model—Flowchart

Figure 2:
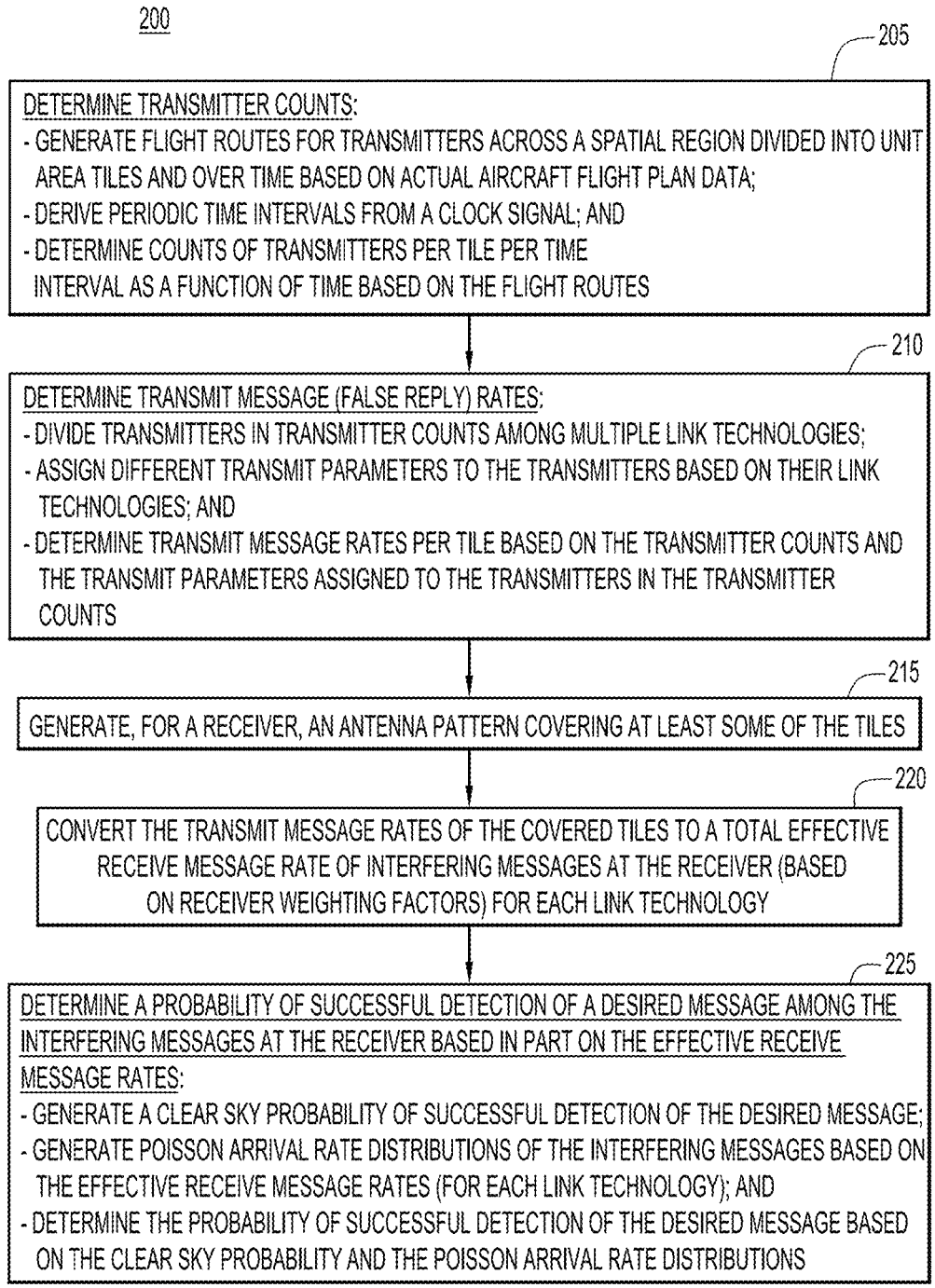
FIG. 2 is a flowchart of an example method of generating a co-channel interference model and evaluating its impact on receiver performance.

With reference to FIG. 2, there is a flowchart of an example method 200 of generating the FRUIT model and evaluating its impact on receiver performance. The operations of method 200 are performed in a computer and are described in detail below.

2.2.1 Generating/Determining Spatial-Temporal Aircraft Counts

Initially, at 205, a spatial-temporal distribution or density of numbers of aircraft (referred to as "aircraft counts") is generated. It is assumed that each aircraft hosts a corresponding interfering transmitter such that the aircraft counts correspond to interfering transmitter counts. Thus, the terms "aircraft" and "transmitter" may be used interchangeably in the ensuing description. Because aircraft are not uniformly distributed in space or time in reality, the following approach is used to generate aircraft counts appropriately (i.e., realistically) distributed over space and time. The spatial-temporal distribution of numbers of aircraft is generated based on real/actual flight plan data containing departure times, origins, and destinations of nearly every aircraft in the world grouped in Coordinated Universal Time (UTC) hourly files. An assumption is that aircraft do not generally spontaneously appear in airspace, but depart from a known airport and traverse airspace to a destination airport.

For an airborne or a space-based receiver (e.g., receiver 102) at a high altitude relative to the aircraft hosting interfering transmitters (e.g., transmitters 106, 110, and 114), most of the aircraft of interest are located over oceanic airspace where aircraft generally fly great circle routes (shortest distance over the Earth). An expected airspeed of a given aircraft may be estimated as a function of a distance between the departing and destination airports for that aircraft such that a greater distance corresponds to a higher expected average aircraft velocity. Operation 205 generates a spatial grid across the globe (referred to as a "global grid" or a "global tile grid") and implements a flight simulator that "flies" virtual aircraft across the global grid along flight routes based on the real flight plan data. With the virtual aircraft departing at defined times and flying to defined places using expected velocity and trajectories from, e.g., a real-world database obtained from Marks Systems, Inc., Bethesda, Md. (also referred to as "masFlight") containing 3579 world-wide airports, the spatial-temporal aircraft counts are essentially "measured" over the global grid by replaying the flight plans through the flight simulator.

Figure 3:
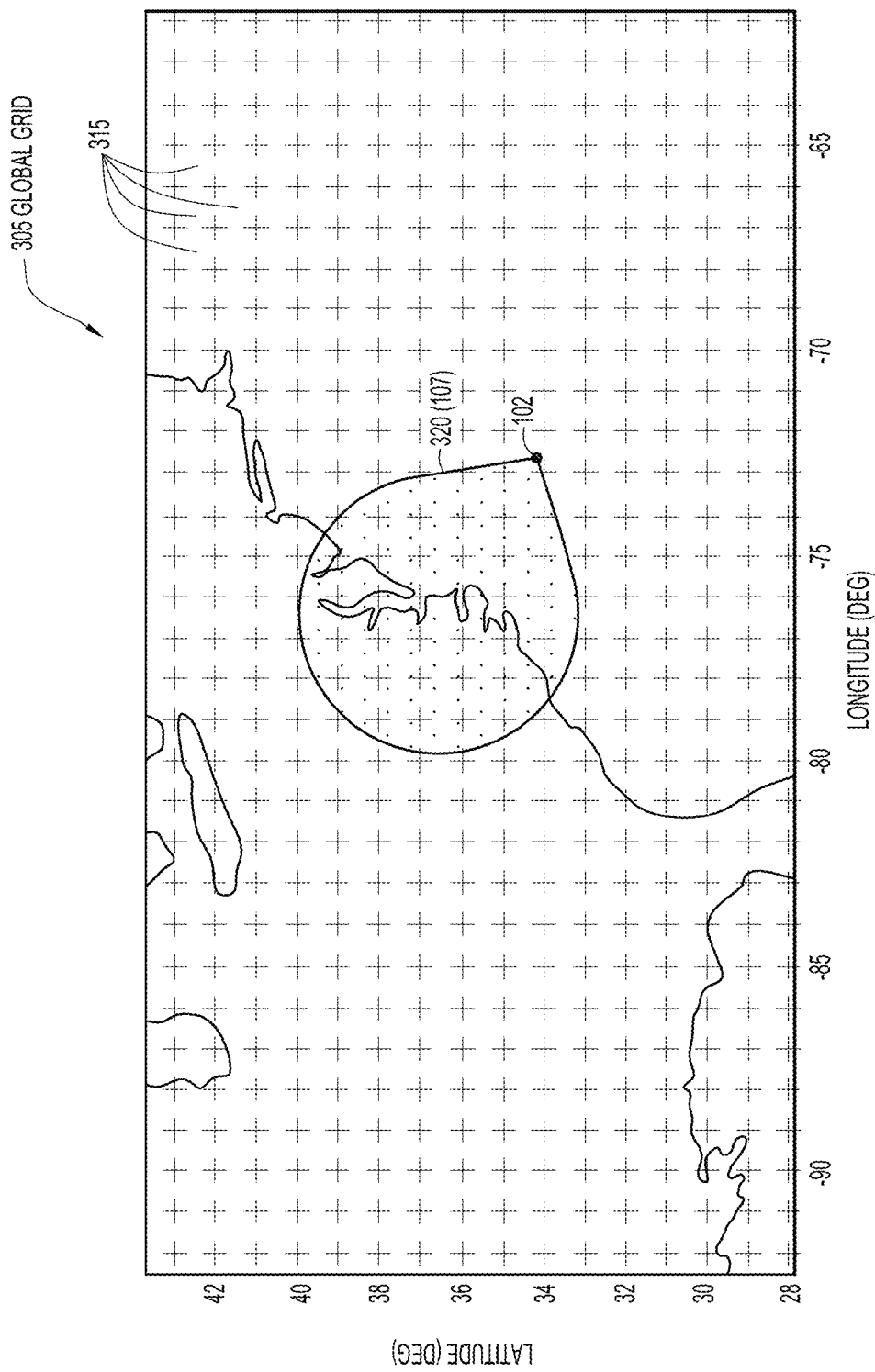
FIG. 3 is an illustration of an example region of a global grid divided into area tiles traversed by virtual aircraft as they follow respective flight routes across the region.

To generate the global grid, a spatial region across the globe is divided into unit area patches or tiles, as depicted in FIG. 3. With reference to FIG. 3, there is an illustration of an example portion/region 305 of a global grid divided into area tiles 315 traversed by virtual aircraft (not shown in FIG. 3) over time as they follow their flight plans/routes. In the example of FIG. 3, region 305 covers the Eastern United States and a portion of the Atlantic Ocean. The grid spacing (i.e., tile area) may be set to 1 degree by 1 degree over the WGS-84 earth model, although other unit areas may be used. The aircraft counts are such that any aircraft that passes near or through a grid point (rounding the decimal coordinates to the nearest value) are counted in "real time" during periodic time intervals (also referred to as "update intervals" and "unit time intervals"), such as in one minute time window bins. The periodic time intervals may be derived from a real time clock signal received from a processor clock as described below in connection with FIG. 5, for example. The peak 1 minute aircraft count then becomes associated with a given UTC hour at that grid point location. One minute time windows were chosen since although many aircraft may pass over a grid point within an hour, only those that are there within one minute of each other should be considered "clustered" in time and space where transmitted messages can be assumed to be coming from a group. The UTC hour count is set to the worst-case minute so that within a spatial region, for every tile, there is an assigned worst minute for that tile (inherently a conservative estimate).

Figure 4:
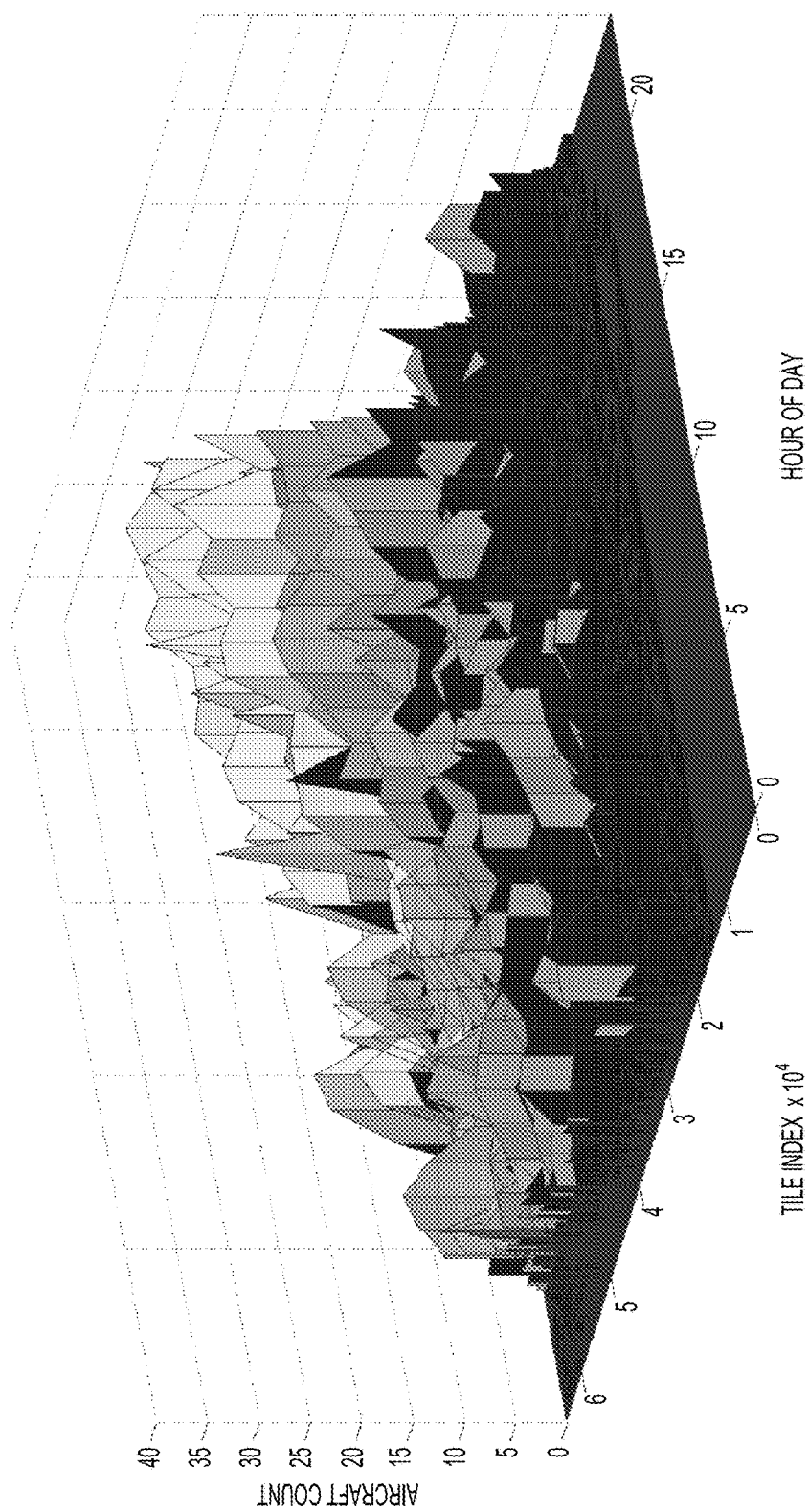
FIG. 4 is a screen shot of a plot of example aggregated aircraft counts generated in the co-channel interference model.

With reference to FIG. 4, there is a plot of example aggregated aircraft counts 400. The axes in the plot of FIG. 4 include: (i) tile index, given by $t_i = 360 \cdot (90 + \theta_i) + \lambda_i$, where $-90 \leq \theta_i \leq 90$ is the latitude and $0 \leq \lambda_i < 360$ is the longitude of the $i^{th}$ tile, as the left horizontal axis, (ii) the UTC hour of the day as the right horizontal axis, and (iii) the peak of the 1 minute window aircraft counts in each hour as the vertical axis. Aircraft counts per tile at a given time are determined from the values represented in the plot of FIG. 4.

2.2.2 Generating Expected Transmitted Message Rates

Returning again to method 200 of FIG. 2, once the aircraft counts (i.e., transmitter counts) are distributed in space and time and the aircraft counts per tile (i.e., transmitter counts per tile) at a given time are determined at 205 based on the distribution, at 210 the aircraft counts are converted to categorized expected transmitted message rates per tile as a function of time, as will be described below. The conversion operation is typically performed during an applicable hour of analysis such that the spatial profile is two-dimensional and is assumed not to vary appreciably over time within the hour. This assumption accounts for the fact that the FRUIT model applies the worst-cast traffic in each tile (e.g. a max-max case is held steady over the simulation hour). For example, if FRUIT impact analysis is being assessed at 12:23 Zulu time (Z), then the $12^{th}$ hour aircraft count profile over the tile indices would be indexed from the matrix as $\kappa(t_i, h)$, for $1 \leq i \leq n$.

Transmit-related parameters (more simply referred to as "transmit parameters") are assigned to the aircraft (i.e., transmitters), as follows. First, the aircraft counts need to be categorized by link technology (also referred to below as link "category" or "type") and transmit power. That is the aircraft counts are divided among the link categories and transmit powers such that respective fractions of the aircraft counts are allocated to Mode S, ADS-B, and ATCRBS. Furthermore, the transmitted messages are also distributed between a top antenna for top transmission and a bottom antenna for bottom transmission associated with the transmitters where applicable.

Table 1 and Table 2 below represent FRUIT model transmit-related parameters for the categorization of aircraft transmissions (across link technologies and transmit powers) that enable a transition from aircraft counts to message rates in each respective category (link category and transmit power). The values presented in Tables 1 and 2 are initial values that were determined through an analysis of the aircraft population in the U.S. Northeast in combination with assumptions about a Traffic Collision Avoidance System (TCAS) and secondary surveillance radar (SSR) reply rates given average aircraft density and radar density in that region. All of the parameters listed in Tables 1 and 2 are configurable.

TABLE 1

Aircraft Transmitter Message Categorization Assumptions

| Parameter | Symbol | Value |
| --- | --- | --- |
| Fraction Mode S | $\upsilon_{Mode\ S}$ | 0.9 |
| Fraction of Mode S that has ADS-B | $\upsilon_{ADS-B}$ | 0.3 |
| ADS-B msgs/s/aircraft | $\omega_{ADS-B}$ | 6 |
| Mode S msgs/s/aircraft | $\omega_{Mode\ S}$ | 6 |
| ATCRBS msgs/s/aircraft | $\omega_{ATCRBS}$ | 60 |
| ADS-B Fraction of Top transmissions | $\alpha_{ADS-B}$ | 0.5 |
| Mode S Fraction of Top transmissions | $\alpha_{Mode\ S}$ | 0.5 |
| ATCRBS Fraction of Top transmissions | $\alpha_{ATCRBS}$ | 0 |

The $1^{st}$ row of Table 1 indicates that the fraction of aircraft counts (e.g., in each tile) allocated to the Mode S link technology is 0.9. The $2^{nd}$ row indicates that a fraction 0.3 of the 0.9 fraction of the aircraft counts allocated to the Mode S link technology is allocated to the ADS-B link. The effect of the fractional allocations of aircraft counts (e.g., 0.9 and 0.3) in Table 1 is to divide the aircraft in the aircraft counts among the different link technologies such that each aircraft corresponds to one link technology. The $3^{rd}$ row indicates that the transmit message rate associated with the ADS-B link technology is 6 messages (msg)/second(s)/ aircraft. The $6^{th}$, $7^{th}$, and $8^{th}$ rows indicate fractions of aircraft for each of the link technologies that transmit messages in the upward direction substantially toward receiver 102; the proportion directed in the downward direction is given by 1—the fraction in the upward direction (e.g., 1-0.5, etc.)

TABLE 2

Aircraft Transmitter Power Assumptions

| Link Tech | Symbol | 125 W | 250 W | 500 W |
|---|---|---|---|---|
| ADS-B | $\eta_{ADS\text{-}B}$ | 0.25 | 0.5 | 0.25 |
| Mode S | $\eta_{Mode\ S}$ | 0.54 | 0.3 | 0.16 |
| ATCRBS | $\eta_{ATCRBS}$ | 1 | 0 | 0 |

The rows in Table 2 allocates ranges of transmit powers across corresponding ones of the link technologies.

Although the tabulated transmit-related parameters will have their own spatial and temporal distribution, the FRUIT model uses these values for "worst case" purposes. Over the ocean, there will certainly be a lower percentage of ATCRBS and lower power transmitters, but there will also be a lower aircraft count and redistributing the categorization would therefore have a negligible effect. Tables 1 and 2 are assumed to be representative of the populations in high aircraft density regions where the FRUIT model would have more impact on the probability of successful reception and decoding of the desired message $P_d$.

To determine the expected transmitted message rates per tile at a given time in a particular category (link technology and transmit power), the respective tabulated transmit-related parameters/coefficients and the aircraft counts profile $\kappa(t_i, h)$ are multiplied together. For example, equation (3) below evaluates the expected number of transmitted messages per second per tile at a given time (h) for the lowest level category of the ADS-B link technology, e.g., for ADS-B operating at the lowest transmit power level of 125 W:

$$\phi_{ADS\text{-}B,Top,125W}(t_i,h) = \kappa(t_i,h) \cdot \nu_{ModeS} \cdot \nu_{ADS\text{-}B} \cdot \omega_{ADS\text{-}B} \alpha_{ADS\text{-}B} \cdot \eta_{ADS\text{-}B,125W}$$

$$\phi_{ADS\text{-}B,Bottom,125W}(t_i,h) = \kappa(t_i,h) \cdot \nu_{ModeS} \cdot \nu_{ADS\text{-}B} \cdot \omega_{ADS\text{-}B} \cdot (1-\alpha_{ADS\text{-}B}) \cdot \eta_{ADS\text{-}B,125W} \quad (2)$$

Equation (2) is replicated for the lowest, middle, and highest transmit power levels for each link technology to give a total expected transmit message rate per tile at a given time for that link technology.

2.2.3 Generating Antenna Beam Pattern

Once the aircraft counts profile $\kappa(t_i, h)$ has been translated to expected transmitted messages per tile at a given time in each respective link category using the transmit-related parameters as described above, at 215, an antenna beam gain pattern (e.g., a phased array beam gain pattern) corresponding to receive beam 307 of receiver 102 is generated, and the generated beam pattern is applied over an area/region of the tile grid space to capture the transmitted messages in the tiles covered by the applied antenna beam pattern; the FRUIT model impact on $P_d$ may then be determined based on messages transmitted from aircraft in the covered tiles. With reference again to FIG. 3, there is shown an example generated antenna beam pattern or "footprint" 320, associated with a known $E_b/N_0$ above a required link margin for receipt of messages at receiver 102, overlaid on the tile grid space.

2.2.4 Converting Expected Transmit Message Rates to Effective Receive Message Rates Returning to method 200 of FIG. 2, at 220, the categorized expected transmit message rates for the covered tiles are converted into total effective receive message rates (arrival rates) experienced at receiver 102 based on false reply contributions from tiles covered by the generated antenna beam in the following manner. The transmit messages rates from all of the covered tiles contribute to a total expected transmitted message rate captured by receive beam 107 and thus experienced at receiver 102. Thus, to evaluate the impact of the FRUIT model on the performance of receiver 102 at a particular time (e.g., hour of the day), the categorized transmitted messages rates for all of the covered tiles (i.e., those tiles falling under the beam footprint) are totaled for each category to produce total expected transmit message rates under the beam footprint for each category.

To convert the total expected transmit message rates for each category, e.g., Mode S, to an effective receive message rate that would be received by antenna beam 107 for that category and thus degrade the ability of receiver 102 to detect desired message 104, equation (2) may be expanded to account for each lambda ($\lambda$) value (when combined with the appropriate tau ($\tau$) value) in equation (1) as follows:

$$\phi_{Mode\ S}(h) = \sum_{i=1}^{n} \phi_{Mode\ S,Top,125W}(t_i,h) + \sum_{i=1}^{n} \phi_{Mode\ S,Bottom,125W}(t_i,h) + \sum_{i=1}^{n} \phi_{Mode\ S,Top,250W}(t_i,h) + \sum_{i=1}^{n} \phi_{Mode\ S,Bottom,250W}(t_i,h) + \sum_{i=1}^{n} \phi_{Mode\ S,Top,500W}(t_i,h) + \sum_{i=1}^{n} \phi_{Mode\ S,Bottom,500W}(t_i,h) \quad (3)$$

Equation 3 represents the effective receiver message rate for the Mode S link technology. In addition, effective receiver message rates $\phi_{ATCRBS}$ and $\phi_{ES}$ for the ATCRBS and ADS-B link technologies are similarly calculated.

A summary of the operations used in the converting includes: determining receiver-related weighting factors ($\gamma_{t_i}$) per tile based on a message error rate (MER) of the receiver absent interfering signals and signal-to-noise ratios per tile relative to a noise floor ($E_b/N_0$) and predetermined transmit powers for the transmitters per tile, applying the receiver-related weighting factors to corresponding ones of the transmit message rates (in equation 3) to produce the effective receive message rate, and combining the weighted transmit message rates to produce the effective receive message rate.

2.2.5 Determining Probability of Successful Detection

Once the effective receiver message rates for the different link technologies/categories are determined, at 225, the probability of successful detection of the desired message (e.g., a desired ADS-B message) in the presence of the interfering receive messages (e.g., other ADS-B messages, Mode S messages, and ATCRBS messages) may be determined. To do this, the calculated effective message rates for the different link technologies are used to populate $P_{env}$ in equation (1) (i.e., where $P_{env}$ represents the scaling factor to the clear sky probability of detection in equation (1)). The value of $P_{env}$ can be used to determine the effective $P_d$ of any given desired ADS-B message that was transmitted and captured by antenna beam 107 during a dwell time of the antenna beam (assuming the antenna beam dwell time is, for example, ≤12 s), where the desired ADS-B message's clear sky probability of successful reception is $P_R$.

A summary of the operations used in determining the probability of successful detecting includes: generating a clear sky probability of successful detection of the desired message absent interfering messages ($P_R$); generating a Poisson arrival rate distribution of the interfering messages that is based on the effective receive message rate ($P_{env}$) that combines contributions from each link category); and determining the probability of successful detection of the desired message among the interfering signals based on the clear sky probability and the Poisson arrival rate distribution ($P_d$).

3. Computer System

Figure 5:
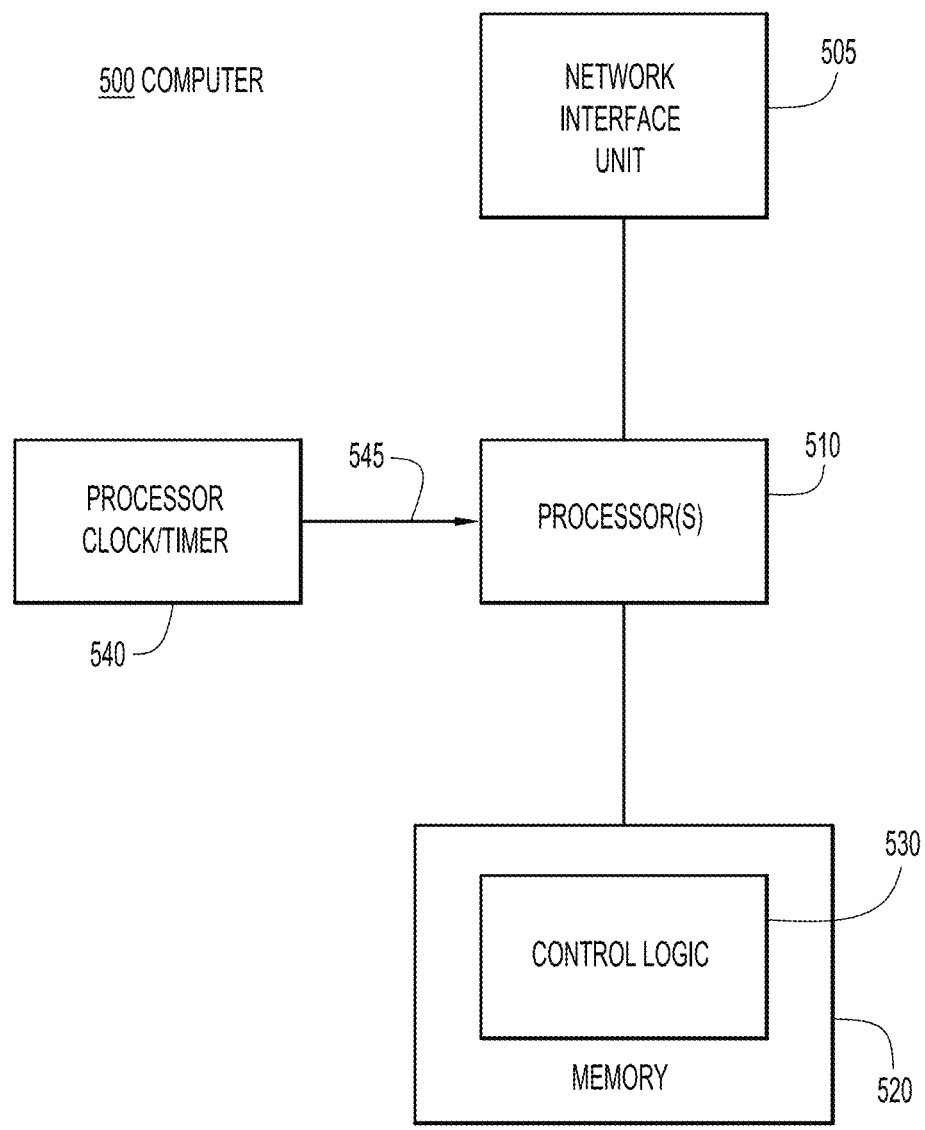
FIG. 5 is a block diagram of an example computer device on which the co-channel model may be implemented.

With reference to FIG. 5, there is a block diagram of an example computer device 500 on which the FRUIT model described above may be implemented. Computer 500 includes an interface unit 505 configured to receive and send data from and to a user and/or communication network. Computer 500 includes one or more processors 510 that execute software stored in memory 520. The processor(s) 510 is/(are) for example, a microprocessor or microcontroller. To this end, the memory 520 stores instructions for control logic 530. When the one or more processors 510 execute control logic 530, processors 510 performs the operations described herein to implement the FRUIT model, including the operations described in connection with method 200. Computer 500 also includes a real-time clock/timer 540 to generate a (real-time) clock signal 545 and provide the clock signal to processor 510. Processor 510 derives periodic time intervals (i.e., unit time intervals) from clock signal 545 and uses the time intervals to derive aircraft counts per tile per unit time interval, as described above.

Memory 520 may comprise read only memory (ROM), random access memory (RAM), magnetic disk storage media devices, optical storage media devices, flash memory devices, electrical, optical, or other physical/tangible memory storage devices. Thus, in general, the memory 520 may comprise one or more tangible (non-transitory) computer readable storage media (e.g., a memory device) encoded with software comprising computer executable instructions and when the software is executed (by the processor(s) 510) it is operable to perform the operations described herein.

Memory 520 also stores data used and generated by control logic 530, including actual flight plan data, transmit-related parameters (e.g., from Tables 1 and 2), receiver-related parameters, generated antenna pattern information, aircraft/transmitter counts, transmit and receiver message rates per tile, and any other information relevant to implementing the FRUIT model.

As discussed above, the FRUIT model may also be used in an actual receiver to validate the performance of that receiver, as is now discussed in connection with FIGS. 6 and 7.

4. Receiver System

Figure 6:
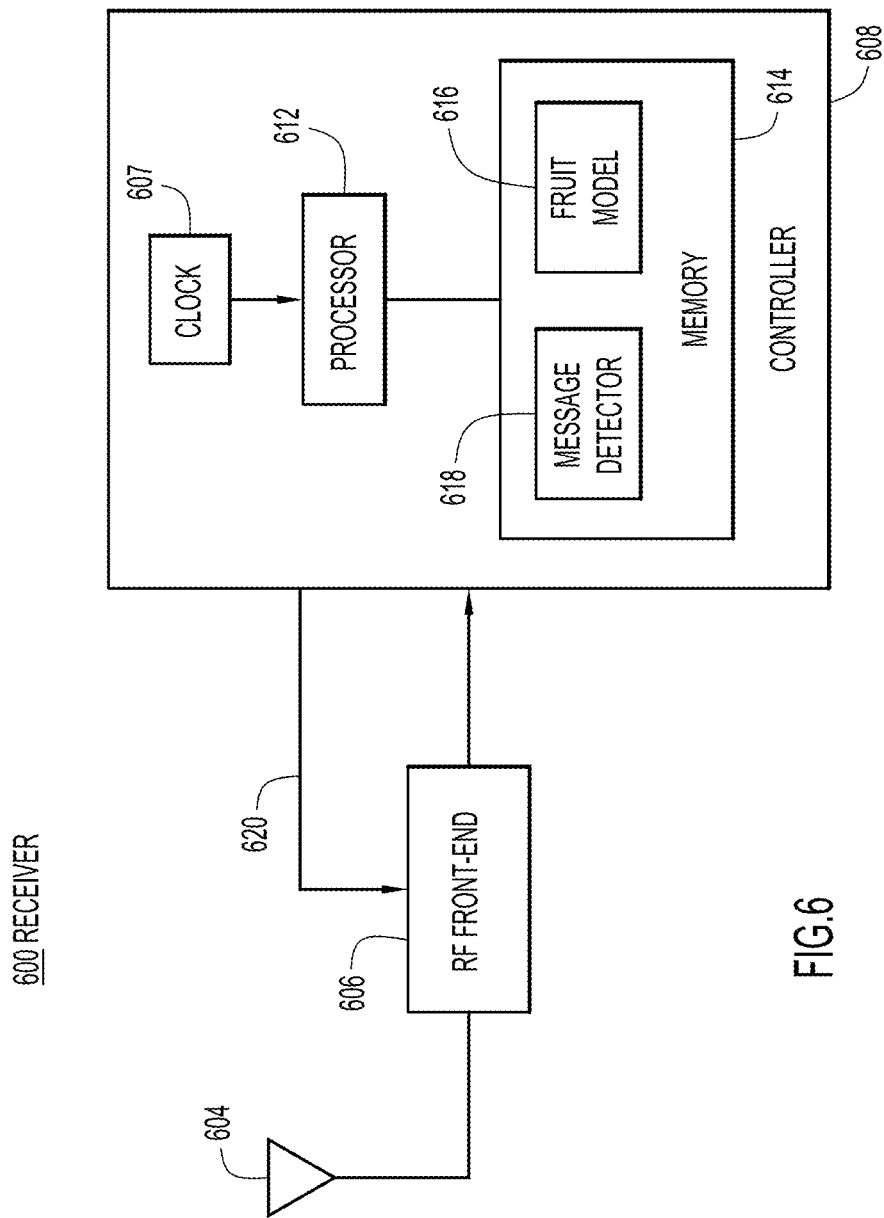
FIG. 6 is a block diagram of an example physical or virtual receiver that uses the co-channel interference model to evaluate and improve detection performance of the receiver.

With reference to FIG. 6, there is a shown a block diagram of an actual physical receiver 600, corresponding to receiver 102 in FIG. 1 for example, that uses an instance of the FRUIT model to improve detection performance of the receiver. In another embodiment, receiver 600 may be a virtual receiver implemented as a computer program. Receiver 600 includes an antenna 604, an RF front-end 606, and a controller 608. Antenna 604 delivers to RF front-end 606 RF signals, including desired messages and interference, captured in a receive beam associated with the antenna. RF front-end 606 includes RF signal processing components such as a frequency down-converter, amplifiers, attenuators, and filters, and an analog-to-digital converter (ADC) (not specifically shown in FIG. 6) to convert the captured RF signals to a digitized baseband or near-baseband signal, and provides the digitized signal to controller 608.

Controller 608 includes a processor 612 to execute program modules stored in a memory 614, including a FRUIT model 616 as described above, and a message detector 618 that may select among a variety of different detection algorithms under control of the processor to (attempt to) detect desired messages in the digitized signal from RF front-end 606. Controller includes a clock 607 to provide a clock signal to processor 612. Controller 608 also controls/configures the RF signal processing components of RF front-end 606 via control messages 620, for example, to form desired receive antenna beam patterns, and condition the captured RF signal for improved reception, e.g., by adjusting parameters such as attenuation, frequency bandwidth, and amplifier gain.

5. Receiver Method

Figure 7:
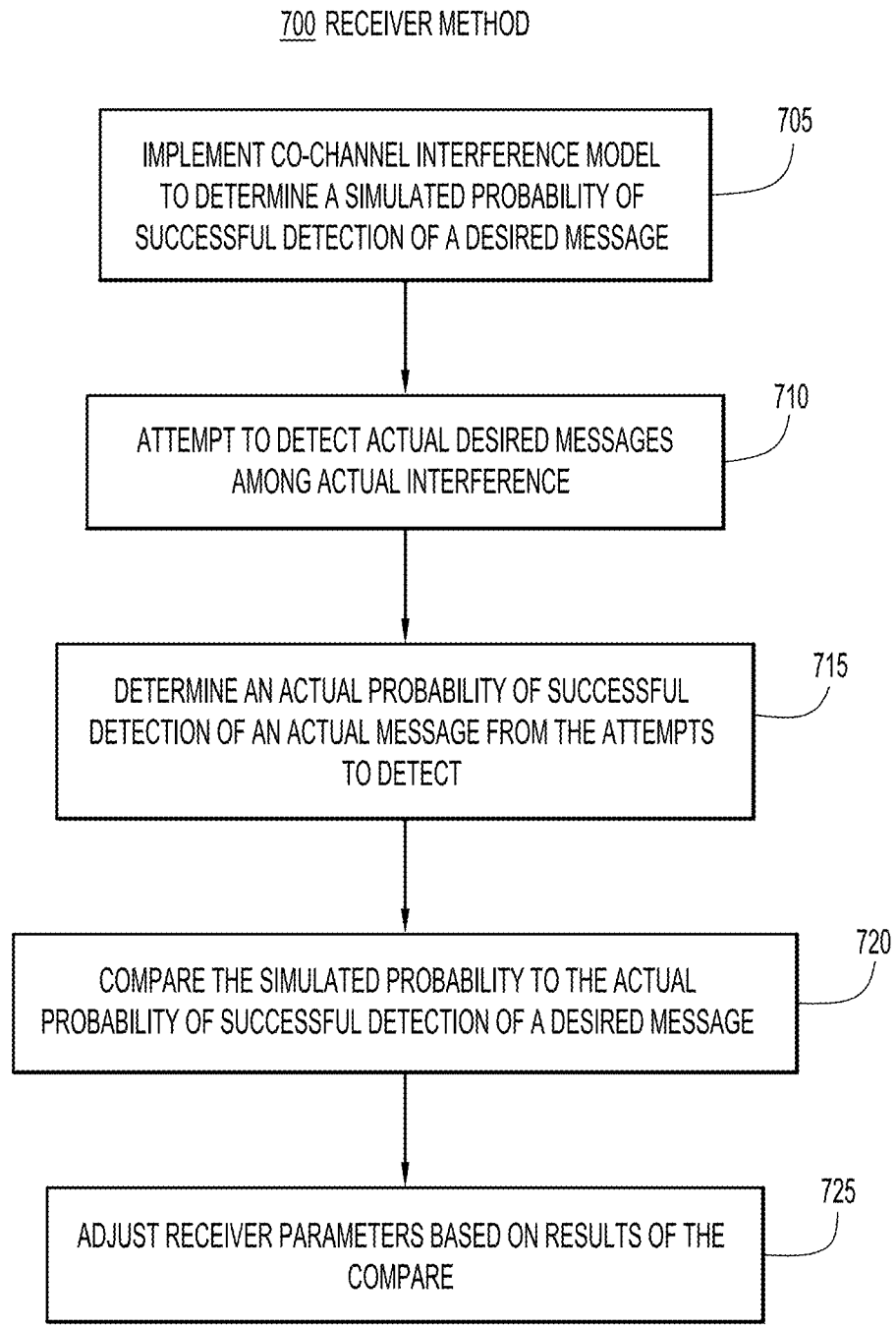
FIG. 7 is a flowchart of an example method of using the Fruit model performed in the receiver of FIG. 6.

With reference to FIG. 7, there is a flowchart of an example method 700 of using the Fruit model (e.g., FRUIT model 616) in receiver 600 to monitor and improve detection performance of the receiver 600.

At 705, controller 608 invokes FRUIT model 616 (i.e., performs method 200) to generate simulated co-channel interference and determine a simulated probability of successful detection of a desired message among the simulated interference. FRUIT model 616 may generate a receive beam pattern (to capture transmissions from tiles) that matches the actual receiver beam pattern formed by antenna 604.

At 710, controller 608 attempts to detect actual desired messages among actual interference present in the digitized baseband signal from RF front-end 606. Controller 608 may initially select a message detector algorithm among multiple possibilities to detect the actual desire message.

At 715, controller 608 determines an actual probability of detecting a desired message based on results from the attempts to detect at 710.

At 720, controller 608 compares the simulated probability to the actual probability of successful detection of a desired message.

At 725, controller 608 adjusts one or more RF signal processing parameters in RF front-end 606 and/or selects a different message detector algorithm to detect the actual desired messages based on results of the compare. For example, controller 608 may adjust (e.g., increase or decrease) an RF front-end filter bandwidth, attenuation, and/or amplifier gain to increase the actual probability of detection of the actual desired message relative to the simulated probability.

Method 700 repeats over time to periodically adjust the receiver parameters.

6. Summary

In summary, embodiments presented herein distribute FRUIT (co-channel interference) in time and space and aggregate the false replies for receiver (e.g., ADS-B) update interval performance estimations is a relatively fast and scalable approach. The FRUIT aircraft/transmitter density model varies with time and space based on actual flight plan data. The model breaks down aircraft equipage (i.e., transmit equipment) through analysis, and expected transmitted message rates to a low level, which allows the model to be more organic and representative of a receiver's perspective in the midst of interference. The model breaks down the aircraft patterns to categorized messages and then normalizes the categorized messages back up to an equation that captures the effective impact of the interference environment assuming a Poisson Arrival rate distribution of the messages in time.

An embodiment of the model described above assesses the performance of an airborne or ground based receiver of ADS-B messages. The model receives the following inputs: flight plan data and/or measured unique aircraft counts; ADS-B equipage transmit characteristics, which may be based on a standard, such as the Radio Technical Commission for Aeronautics (RTCA) Standard DO-260B for ADS-B; 1090 MHz equipage reply rate assumptions based on analysis; ADS-B receiver gain pattern and expected performance; link budget assumptions including aircraft antenna gain patterns; and a receiver model message error rate model. An output based on the inputs includes an expected probability of successful ADS-B message reception and decoding given the interference environment in view as a function of time.

The model takes into account factors such as: aircraft/transmitter distributions are typically not uniform in wide areas; aircraft/transmitter distributions follow patterns that approximately repeat on a daily basis and should be time variant as well as spatially variant; and mixed avionics equipage (i.e., transmit equipment) should be normalized relative to expected received power. The model may use different grid spacing, e.g., finer tile grids, for modeling performance for different receiver platforms, such as, but not limited to, weather balloons, individual aircraft receivers, ADS-B ground stations, and the like.

In one form, a computer implemented is provided comprising: simulating flight routes for simulated airborne transmitters across a spatial region divided into area tiles and over time based on actual aircraft flight plan data; generating a clock signal and deriving periodic time intervals from the clock signal; determining transmitter counts per tile per time interval based on the flight routes; assigning transmit parameters, including transmit message rates, to the transmitters; determining transmit message rates per tile based on the transmitter counts and the transmit parameters assigned to the transmitters in the transmitter counts; generating, for a simulated receiver, an antenna pattern covering at least some of the tiles; converting the transmit message rates of the covered tiles to a total effective receive message rate of interfering messages at the receiver; and determining a probability of successful detection of a desired message among the interfering messages at the receiver based in part on the effective receive message rate.

In another form, an apparatus is provided comprising: an antenna; a radio frequency (RF) receiver coupled to the antenna; and a controller, coupled to the RF receiver, configured to perform a computer simulation to: determine transmitter counts per tile across a spatial region divided tiles; assign transmit parameters, including transmit message rates, to the transmitters; determine transmit message rates per tile based on the transmitter counts and the transmit parameters assigned to the transmitters in the transmitter counts; generate, for a receiver, an antenna pattern covering at least some of the tiles; convert the transmit message rates of the covered tiles to a total effective receive message rate of interfering messages at the receiver; and determine a probability of successful detection of a desired message among the interfering messages at the receiver based in part on the effective receive message rate.

In yet another form, a computer program product is provided. The computer program product includes non-transitory computer readable storage media encoded with instructions that, when executed by a processor, cause the processor to execute operations to: simulate flight routes for simulated airborne transmitters across a spatial region divided into unit area tiles and over time based on actual aircraft flight plan data; derive periodic time intervals from a clock signal provided to the processor; determine transmitter counts per tile per time interval based on the flight routes; assign transmit parameters, including transmit message rates, to the transmitters; determine transmit message rates per tile based on the transmitter counts and the transmit parameters assigned to the transmitters in the transmitter counts; generate, for a simulated receiver, an antenna pattern covering at least some of the tiles; convert the transmit message rates of the covered tiles to a total effective receive message rate of interfering messages at the receiver; and determine a probability of successful detection of a desired message among the interfering messages at the receiver based in part on the effective receive message rate.

The above description is intended by way of example only.

What is claimed is:

1. A computer implemented method comprising:
   simulating flight routes for simulated airborne transmitters across a spatial region divided into area tiles and over time based on actual aircraft flight plan data;
   generating a clock signal and deriving periodic time intervals from the clock signal;
   determining transmitter counts per tile per time interval based on the flight routes;
   assigning transmit parameters, including transmit message rates, to the transmitters;
   determining transmit message rates per tile based on the transmitter counts and the transmit parameters assigned to the transmitters in the transmitter counts;
   generating, for a simulated receiver, an antenna pattern covering at least some of the tiles;
   converting the transmit message rates of the covered tiles to a total effective receive message rate of interfering messages at the receiver; and
   determining a probability of successful detection of a desired message among the interfering messages at the receiver based in part on the effective receive message rate.

2. The method of claim 1, wherein:
   the simulating flight routes includes respectively flying each transmitter from a departing airport beginning at a departure time to a destination airport along a flight route that traverses at least some of the tiles and at a velocity that corresponds to a distance of the flight route between the airports, wherein the airports and departure time are each identified in the actual flight plan data; and
   the determining transmitter counts includes counting transmitters that traverse each tile during the periodic time intervals as a function of time.

3. The method of claim 1, wherein the assigning transmit parameters includes:
   dividing the transmitters in each transmitter count among multiple link technologies such that each transmitter corresponds to one link technology; and
   assigning different parameters to the transmitters, including different transmit message rates, based on the corresponding link technologies of the transmitters.

4. The method of claim 3, wherein the dividing includes dividing the transmitters in each transmitter count among Mode S, ADS-B, and ATCRB link technologies.

5. The method of claim 3, wherein the assigning different transmit parameters further includes assigning a range of transmit powers across the transmitters corresponding to each link technology.

6. The method of claim 5, wherein the assigning different transmit parameters further includes assigning transmit directions substantially toward and substantially away from the receiver to respective first and second portions of the transmitters corresponding to at least one of the link technologies.

7. The method of claim 1, wherein the converting includes:
   determining receiver-related weighting factors per tile per based on a message error rate (MER) of the receiver absent interfering signals and signal-to-noise ratios per tile relative to a noise floor and predetermined transmit powers for the transmitters per tile;
   applying the receiver-related weighting factors to corresponding ones of the transmit message rates to produce the effective receive message rate; and
   combining the weighted transmit message rates to produce the effective receive message rate.

8. The method of claim 1, wherein the determining a probability includes:
   generating a clear sky probability of successful detection of the desired message absent interfering messages;
   generating a Poisson arrival rate distribution of the interfering messages that is based on the effective receive message rate; and
   determining the probability of successful detection of the desired message among the interfering signals based on the clear sky probability and the Poisson arrival rate distribution.

9. The method of claim 1, wherein:
   the assigning includes:
      dividing the transmitters in each transmitter count among multiple link technologies such that each transmitter corresponds to one link technology; and
      assigning different transmit parameters, including different transmit message rates, to the transmitters based on the corresponding link technologies of the transmitters;
   the determining transmit message rates includes determining transmit message rates per tile for each link technology;
   the converting includes converting the transmit message rates per tile for each link technology to a corresponding effective receive message rate of interfering messages for that link technology; and
   the determining a probability includes determining a probability of successful detection of the desired message based in part on the effective receive message rates of interfering messages for all of the link technologies.

10. An apparatus: comprising:
    an antenna;
    a radio frequency (RF) receiver coupled to the antenna; and
    a controller, coupled to the RF receiver, configured to perform a computer simulation to:
       determine transmitter counts per tile across a spatial region divided tiles;
       assign transmit parameters, including transmit message rates, to the transmitters;
       determine transmit message rates per tile based on the transmitter counts and the transmit parameters assigned to the transmitters in the transmitter counts;
       generate, for a receiver, an antenna pattern covering at least some of the tiles;
       convert the transmit message rates of the covered tiles to a total effective receive message rate of interfering messages at the receiver; and
       determine a probability of successful detection of a desired message among the interfering messages at the receiver based in part on the effective receive message rate.

11. The apparatus of claim 10, wherein the controller is further configured to:
    determine an actual probability of successful detection of an actual desired message among actual interference messages delivered from the RF receiver;
    compare the actual probability to the simulated probability; and
    adjust signal processing parameters in the RF receiver responsive to results of the compare.

12. The apparatus of claim 10, wherein the controller is configured to determine transmitter counts by:
    simulating flight routes for simulated airborne transmitters across a spatial region divided into unit area tiles and over time based on actual aircraft flight plan data;
    deriving periodic time intervals from a clock signal; and
    determining transmitter counts per tile per time interval based on the flight routes.

13. The apparatus of claim 12, wherein:
    the controller is configured to simulate flight routes by respectively flying each transmitter from a departing airport beginning at a departure time to a destination airport along a flight route that traverses at least some of the tiles and at a velocity that corresponds to a distance of the flight route between the airports, wherein the airports and departure time are each identified in the actual flight plan data; and
    the controller is configured to determine transmitter counts by counting transmitters that traverse each tile during the periodic time intervals as a function of time.

14. The apparatus of claim 10, wherein the controller is configured to assign transmit parameters by:
    dividing the transmitters in each transmitter count among multiple link technologies such that each transmitter corresponds to one link technology; and
    assigning different parameters to the transmitters, including different transmit message rates, based on the corresponding link technologies of the transmitters.

15. The apparatus of claim 10, wherein the controller is configured to convert by:
    determining receiver-related weighting factors per tile per based on a message error rate (MER) of the receiver absent interfering signals and signal-to-noise ratios per tile relative to a noise floor density and predetermined transmit powers for the transmitters per tile;
    applying the receiver-related weighting factors to corresponding ones of the transmit message rates to produce the effective receive message rate; and
    combining the weighted transmit message rates to produce the effective receive message rate.

16. The apparatus of claim 10, wherein the controller is configured to determine a probability by:
    generating a clear sky probability of successful detection of the desired message absent interfering messages;

generating a Poisson arrival rate distribution of the interfering messages that is based on the effective receive message rate; and determining the probability of successful detection of the desired message among the interfering signals based on the clear sky probability and the Poisson arrival rate distribution.

17. A non-transitory tangible computer readable storage media encoded with instructions that, when executed by a processor, cause the processor to:

simulate flight routes for simulated airborne transmitters across a spatial region divided into unit area tiles and over time based on actual aircraft flight plan data;

derive periodic time intervals from a clock signal provided to the processor;

determine transmitter counts per tile per time interval based on the flight routes;

assign transmit parameters, including transmit message rates, to the transmitters;

determine transmit message rates per tile based on the transmitter counts and the transmit parameters assigned to the transmitters in the transmitter counts;

generate, for a simulated receiver, an antenna pattern covering at least some of the tiles;

convert the transmit message rates of the covered tiles to a total effective receive message rate of interfering messages at the receiver; and determine a probability of successful detection of a desired message among the interfering messages at the receiver based in part on the effective receive message rate.

18. The computer readable storage media of claim 17, wherein:

the instructions to cause the processor to simulate flight routes include instructions to cause the processor to respectively fly each transmitter from a departing airport beginning at a departure time to a destination airport along a flight route that traverses at least some of the tiles and at a velocity that corresponds to a distance of the flight route between the airports, wherein the airports and departure time are each identified in the actual flight plan data; and the instructions to cause the processor to determine transmitter counts include instructions to cause the processor to count transmitter that traverse each tile during the periodic time intervals as a function of time.

19. The computer readable storage media of claim 17, wherein the instructions to cause the processor to assign transmit parameters include instructions to cause the processor to:

divide the transmitters in each transmitter count among multiple link technologies such that each transmitter corresponds to one link technology; and assign different parameters to the transmitters, including different transmit message rates, based on the corresponding link technologies of the transmitters.

20. The computer readable storage media of claim 17, wherein the instructions to cause the processor to convert include instructions to cause the processor to:

determine receiver-related weighting factors per tile per based on a message error rate (MER) of the receiver absent interfering signals and signal-to-noise ratios per tile relative to a noise floor and predetermined transmit powers for the transmitters per tile;

apply the receiver-related weighting factors to corresponding ones of the transmit message rates to produce the effective receive message rate; and combine the weighted transmit message rates to produce the effective receive message rate.

21. The computer readable storage media of claim 17, wherein the instructions to cause the processor to determine a probability include instructions to cause the processor to:

generate a clear sky probability of successful detection of the desired message absent interfering messages;

generate a Poisson arrival rate distribution of the interfering messages that is based on the effective receive message rate; and determine the probability of successful detection of the desired message among the interfering signals based on the clear sky probability and the Poisson arrival rate distribution.

22. The computer readable storage media of claim 17, wherein:

the instructions to cause the processor to assign include instructions to cause the processor to:

divide the transmitters in each transmitter count among multiple link technologies such that each transmitter corresponds to one link technology; and assign different transmit parameters, including different transmit message rates, to the transmitters based on the corresponding link technologies of the transmitters;

the instructions to cause the processor to determine transmit message rates include instructions to cause the processor to determine transmit message rates per tile for each link technology;

the instructions to cause the processor to convert include instructions to cause the processor to convert the transmit message rates per tile for each link technology to a corresponding effective receive message rate of interfering messages for that link technology; and the instructions to cause the processor to determine a probability include instructions to cause the processor to determine a probability of successful detection of the desired message based in part on the effective receive message rates of interfering messages for all of the link technologies.

\* \* \* \* \*